United States Patent [19]

Ejiri et al.

[11] Patent Number: 5,456,977
[45] Date of Patent: Oct. 10, 1995

[54] MAGNETIC RECORDING MEDIUM AND PROCESS FOR PRODUCING SAME

[75] Inventors: Kiyomi Ejiri; Masashi Aonuma; Yoichi Hayata, all of Kanagawa, Japan

[73] Assignee: Fuji Photo Film Co., Ltd., Kanagawa, Japan

[21] Appl. No.: 53,347

[22] Filed: Apr. 28, 1993

Related U.S. Application Data

[63] Continuation of Ser. No. 774,946, Oct. 11, 1991, abandoned.

[30] Foreign Application Priority Data

Oct. 12, 1990 [JP] Japan ..................................... 2-273561

[51] Int. Cl.$^6$ ............................................. B32B 5/16
[52] U.S. Cl. .................... 428/328; 428/329; 428/340; 428/694 BN
[58] Field of Search .................... 428/694 BN, 329, 428/328, 340; 427/128

[56] References Cited

U.S. PATENT DOCUMENTS

| | | | |
|---|---|---|---|
| 4,670,337 | 6/1987 | Tokuoka et al. | 428/323 |
| 4,670,337 | 6/1987 | Tokuoka et al. | 428/323 |
| 4,759,979 | 7/1988 | Kosha et al. | 428/323 |
| 4,801,505 | 1/1989 | Ejiri et al. | 428/404 |
| 4,820,565 | 4/1989 | Funahashi et al. | 428/64 |
| 4,917,947 | 4/1990 | Kosha et al. | 428/329 |
| 4,959,263 | 9/1990 | Aonuma et al. | 428/329 |
| 5,057,364 | 10/1991 | Saito et al. | 428/323 |
| 5,091,270 | 2/1992 | Ohya et al. | 428/695 |
| 5,093,191 | 3/1992 | Sano et al. | 428/323 |
| 5,096,774 | 3/1992 | Sano et al. | 428/323 |

*Primary Examiner*—D. S. Nakarani
*Assistant Examiner*—H. Thi Lê
*Attorney, Agent, or Firm*—Sughrue, Mion, Zinn, Macpeak & Seas

[57] ABSTRACT

A magnetic recording medium is disclosed, comprising a nonmagnetic support having thereon a magnetic layer containing a ferromagnetic powder and a binder, wherein the magnetic layer contains at least one of $\alpha\text{-Al}_2\text{O}_3$ and $\text{Cr}_2\text{O}_3$ in an amount of 5 to 15% by weight based on the weight of the ferromagnetic powder, the density of at least one of $\alpha\text{-Al}_2\text{O}_3$ and $\text{Cr}_2\text{O}_3$ in the surface of the magnetic layer is less than $0.25/\mu\text{m}^2$, the intensity ratio of Al spectrum to Fe spectrum as determined by ESCA is in the range of 0.05 to 0.20, or the intensity ratio of Cr spectrum to Fe spectrum as determined by ESCA is in the range of 0.02 to 0.08, and the magnetic layer contains a fatty acid or a fatty acid ester, and the fatty acid or fatty acid ester is orientated in the surface of the magnetic layer. And further a process for producing the above magnetic recording medium is disclosed.

6 Claims, 1 Drawing Sheet

FIGURE

MAGNETIC RECORDING MEDIUM AND PROCESS FOR PRODUCING SAME

This is a continuation of U.S. application Ser. No. 07/774,946, filed Oct. 11, 1991 now abandoned.

FIELD OF THE INVENTION

The present invention relates to a magnetic recording medium having a basic structure comprising a nonmagnetic support and a magnetic layer provided on the support, and a process for production of the magnetic recording medium.

BACKGROUND OF THE INVENTION

As magnetic recording media for audio or video equipment, or computers, etc., general usage is made of magnetic recording media comprising a nonmagnetic support having thereon a magnetic layer comprising a binder and a ferromagnetic powder dispersed therein.

These magnetic recording media are typically produced by coating on a nonmagnetic support a magnetic coating solution. This magnetic coating solution is prepared by dispersing a binder component, such as a resin component, and a granular component, such as a ferromagnetic powder, in a solvent, to thereby form a magnetic coating solution, and after application of a treatment such as a magnetic field orientation treatment, then performing a drying treatment and/or a surface smoothening treatment, and cutting the coated support into the desired form.

Although it is generally considered that the granular component is firmly fixed onto the magnetic layer in the surface of the magnetic layer as produced above, and that the surface is very smooth, it is nonetheless appreciated that, in actual practice, the granular component, such as ferromagnetic powder, is fixed insufficiently on the surface of the magnetic layer. Such an insufficiently fixed granular component is released during running and attaches onto a magnetic head, sometimes causing clogging of the magnetic head. Moreover, in the case of a video tape, for example, dropout is caused sometimes. With such a release of the ferromagnetic powder, the amount of the ferromagnetic powder existing in the vicinity of the surface of the magnetic layer is correspondingly decreased and, thus, with repeating of the running, a problem arises in that electromagnetic characteristics are reduced and, as a result, the output is decreased.

In order to eliminate such problems of dropout, the clogging, and the decrease of the output, JP-A-62-172532 (the term "JP-A" as used herein refers to a "published unexamined Japanese patent application") proposes a method in which the surface of the magnetic layer is subjected to a grinding treatment.

That is, in accordance with the above grinding method, the surface of the magnetic layer which has been made smooth is ground by the use of a high hardness grinding device such as a diamond wheel or a fixed sapphire blade to thereby remove the granular component in the state that is easily released, or materials attaching onto the surface of the magnetic layer, which, as a result, decreases the amount of the material released from the surface of the magnetic layer.

In view of the above background, various investigations have been made for determining methods of decreasing the amount of the material being released, and, in this regard, effective methods other than the grinding of the magnetic layer of the magnetic recording medium have been proposed. For instance, a method in which the magnetic layer of the magnetic recording medium is abraded with an abrasive tape has been proposed in U.S. Pat. No. 5,009,929. It has been found that this method decreases the dropout and the clogging, and permits the production of a magnetic recording medium having good running durability. In accordance with the method, however, the abrasive in the surface of the magnetic layer is exposed, thereby increasing abrasive ability and, as a consequence, there arises a problem that the head is damaged.

As another approach, JP-A-61-57036 proposes a magnetic recording medium in which abrasive particles having Mohs' hardness of at least 6 are incorporated in a proportion of 3 to 15% by weight based on the weight of the magnetic powder, and the average number of the abrasive particles per unit area in the surface of the magnetic layer is controlled to at least $0.25/\mu m^2$.

In accordance with the above method, discoloration due to baking of the head and the clogging are eliminated, and there can be obtained a magnetic recording medium having a high output. In order to control the average number of the abrasive particles per unit area of the surface of the magnetic layer to at least $0.25/\mu m^2$, there is employed a method in which the ferromagnetic powder and the binder are dispersed over a period of 4 hours, and after addition of $\alpha$-$Al_2O_3$ particles, the resulting mixture is dispersed for 4 additional hours. That is, in the course of the dispersing process, the abrasive is added to decrease the degree of dispersion and to weaken the affinity to the binder, thereby facilitating migration of the particles to the surface of the magnetic layer. In this method, however, the abrasive is enclosed by the binder insufficiently.

Thus, the dispersibility of the abrasive in the surface of the magnetic layer is insufficient and, therefore, irregularities in the surface are formed, leading to an increase in the noise and a reduction in the C/N. Moreover, since the amount of the abrasive is relatively large in the surface of the magnetic layer, the filling degree of the ferromagnetic powder is decreased and the RF output is decreased.

Also, JP-A-62-16242, JP-A-62-16244 and JP-A-62-16245 disclose separate dispersion of the abrasive. This separate dispersion improves surface properties and the filling degree. However, the application of the separate dispersion alone causes the disadvantage that since the surface of the abrasive is covered with the binder, the abrasion ability is reduced, leading to a decrease of the output and, furthermore, since the surface properties are improved, the μ value is increased.

In addition, JP-A-63-259830 discloses an abrasive tape treatment. In accordance with this treatment, the abrasive ability is increased, and, therefore, the decrease of the output can be improved and the increase of dropout DO can be prevented. However, since a separate dispersion of the abrasive is not applied, the dispersibility of the abrasive is reduced, the irregularities in the surface are increased, and the RF output and C/N are decreased.

SUMMARY OF THE INVENTION

An object of the present invention is to provide a magnetic recording medium which is improved in RF output and C/N at short recording wavelength such as 1 μm or less, and which is free from a concomitant decrease of output and an increase of dropout.

The present invention relates to a magnetic recording medium comprising a nonmagnetic support having thereon a magnetic layer, said magnetic layer containing a ferromagnetic powder and a binder, wherein the magnetic layer contains at least one of $\alpha\text{-Al}_2\text{O}_3$ and $\text{Cr}_2\text{O}_3$ in a proportion of 5 to 15% by weight based on the weight of the ferromagnetic powder, the density of at least one of $\alpha\text{-Al}_2\text{O}_3$ and $\text{Cr}_2\text{O}_3$ particles in the surface of the magnetic layer is less than 0.25 particles/$\mu m^2$, the intensity ratio of Al spectrum to Fe spectrum as determined by ESCA is 0.05 to 0.20, or the intensity ratio of Cr spectrum to Fe spectrum as determined by ESCA is 0.02 to 0.08, and the magnetic layer contains a fatty acid or a fatty acid ester, and the fatty acid or fatty acid ester is orientated in the surface of the magnetic layer.

The present invention further relates to a process for producing a magnetic recording medium which comprises dispersing a ferromagnetic powder and a part of a binder in a solvent, adding thereto a solution prepared by dispersing at least one of $\alpha\text{-Al}_2\text{O}_3$ particles and $\text{Cr}_2\text{O}_3$ particles in a proportion of 5 to 15% by weight based on the weight of the ferromagnetic powder, using the remainder of the binder in a solvent and then dispersing the solution therein, adding thereto a hardener, and a fatty acid or a fatty acid ester before coating and then stirring to prepare a magnetic coating solution, and coating the thus-prepared magnetic coating solution on a nonmagnetic support, then applying calendering after magnetic orientation and drying, and thereafter bringing the coated support into contact with an abrasive tape under a tension of at least 100 g/cm to thereby effect abrasive treatment.

BRIEF DESCRIPTION OF THE DRAWING

In the drawing, the numerical reference 1 indicates a tape supply roll; 2 indicates an abrasive tape; 3 indicates a fixed blade; 4 indicates an unwoven fabric; 5 indicates a winding roll; 6 indicates a pad (for the abrasive tape); 7 indicates a pad (for the unwoven fabric); 8 indicates a rotary roll (for the abrasive tape); 9 indicates a rotary roll (for the unwoven fabric); and 10 indicates a feed roll.

DETAILED DESCRIPTION OF THE INVENTION

Figure 1:
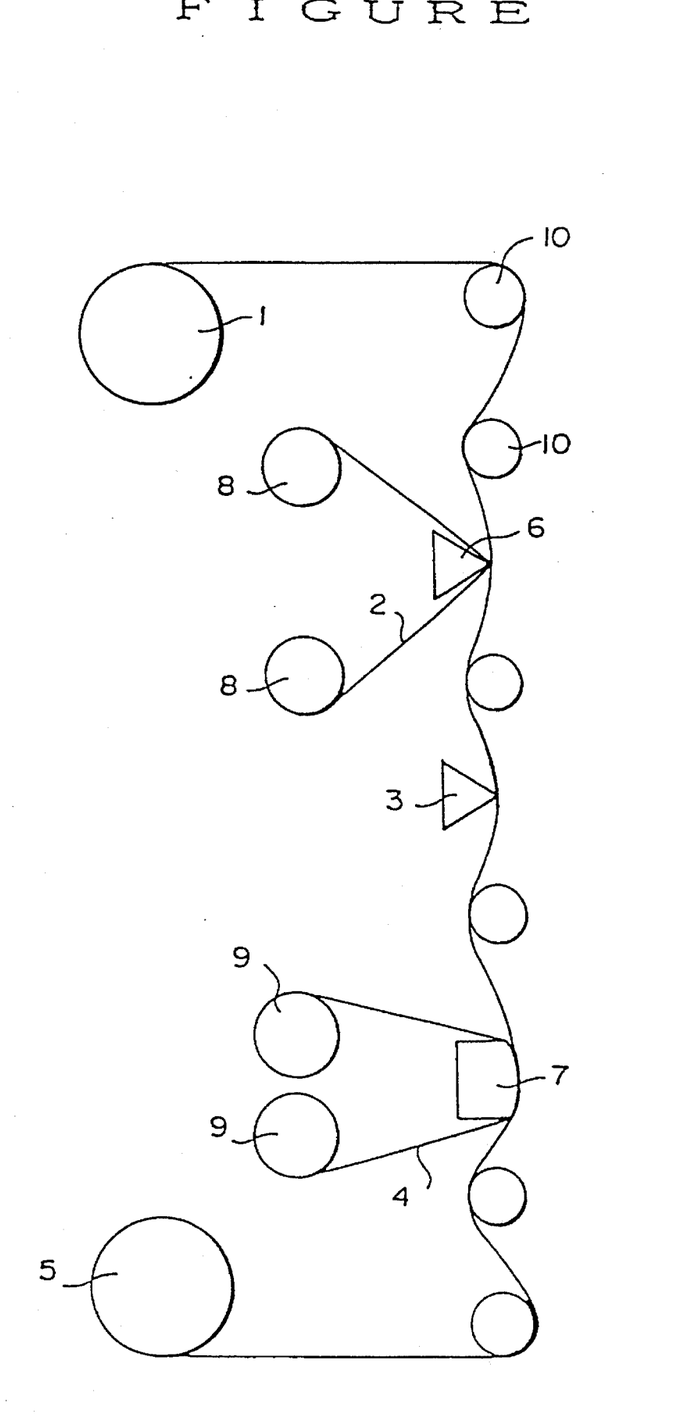
The FIGURE is a schematic diagram showing an example of a process comprising an abrasive treatment, a grinding treatment and withdrawing step according to the present invention.

The abrasive treatment refers to a treatment wherein the abrasive tape is rubbed on the surface of the magnetic layer in the opposite direction relative to the tape running direction to thereby remove protrusions existing on the surface of the magnetic layer and the binder existing on the surface of the magnetic layer. The binder and ferromagnetic powder should be added to the magnetic coating solution separately from the hardener prior to coating. This is because if the hardener is added in advance together with the binder and ferromagnetic powder dispersion, hardening occurs, shortening the pot life, and the fatty acid is adsorbed on the ferromagnetic powder, making it difficult to exhibit the lubricating ability. In order to eliminate these problems, it is preferred that the hardener is added to the magnetic coating solution separately from the binder and ferromagnetic powder dispersion prior to coating, especially immediately before coating.

In the present invention, the density of the abrasive present on the surface of the magnetic layer is controlled to less than 0.25 particles/$\mu m^2$. This proviso increases the filling degree in the surface of the magnetic layer, and improves the RF output. At the same time, the above mentioned separate dispersion of the abrasive in a part of the binder and solvent increases and improves surface properties of the surface of the magnetic layer, thereby improving the C/N. Even when the density of the abrasive present in the surface of the magnetic layer is controlled to less than 0.25 particles/$\mu m^2$ (preferably from 0.10 to less than 0.25 particles/$\mu m^2$) in the present invention, a coating of the binder covering the surface of the abrasive can be removed by the abrasive tape treatment. In this manner, the abrasive is exposed and, therefore, good abrasive ability is exhibited and the increase of DO can be effectively prevented. The amount of the abrasive present in the surface can be checked by the intensity ratio of Al spectrum to Fe spectrum, or Cr spectrum to Fe spectrum as determined by ESCA. By controlling the above value within a specified range, a good cleaning effect can be attained and the decrease of output can be prevented, and at the same time, the increase of DO can be prevented.

If the number of abrasives present in the surface of the magnetic layer is as small as less than 0.25 particles/$\mu m^2$ as in the present invention, the coefficient of friction $\mu$ value is liable to increase. In the present invention, the fatty acid or fatty acid ester is added to the magnetic layer and the abrasive tape treatment is applied, whereby the fatty acid or fatty acid ester can be orientated in the surface of the magnetic layer and there is obtained an effect of effectively decreasing the $\mu$ value. The amount of the abrasive added is 5 to 15% by weight based on the weight of the ferromagnetic powder. This proviso simultaneously accomplishes the prevention of deterioration in the RF output and C/N, and decrease of the output. If the amount of the abrasive added is too small, the cleaning effect is poor, leading to a decrease of the output, and if the amount of the abrasive added is too large, the RF output and the C/N are easily deteriorated.

In accordance with the present invention, when the amount of the abrasive added, the amount of the abrasive present in the surface, the separate dispersion of the abrasive, the addition of the fatty acid or fatty acid ester, and the abrasive tape treatment are specified as described above, there can be obtained a magnetic recording medium in which the RF output, the C/N, the decrease of the output, the increase of the DO, and the jitter are properly managed at the same time.

In the present invention, the magnetic layer contains therein at least one abrasive of $\alpha\text{-Al}_2\text{O}_3$ and $\text{Cr}_2\text{O}_3$. The average particle size of the abrasive is in the range of 0.1 to 1.0 $\mu m$, preferably 0.2 to 0.6 $\mu m$. If the average size of the abrasive is less than 0.1 $\mu m$, the abrasive ability is reduced, and if it is larger than 1.0 $\mu m$, the abrasive ability is too large, leading to possible damage of a head.

In connection with the shape of the abrasive, a granular form which is substantially spherical, a granular form which has a number of corners, and an acicular form are employed. In general, a granular form which is substantially spherical, and a granular form which has a number of corners are preferably employed. The amount of the abrasive added is 5 to 15% by weight based on the weight of the ferromagnetic powder. If the amount of the abrasive added is less than 5% by weight, the output is decreased, and if it is more than 15% by weight, the filling degree of the ferromagnetic powder is decreased, leading to a decrease of the RF output.

The fatty acid which is used in the present invention is a saturated or unsaturated fatty acid having 14 to 24 carbon atoms, including palmitic acid, stearic acid, oleic acid, myristic acid, and behenic acid. The amount of the fatty acid added is 0.1 to 5.0% by weight, preferably 0.2 to 2.0% by weight based on the weight of the ferromagnetic powder.

The fatty acid ester which is used in the present invention is an ester of fatty acid having 14 to 24 carbon atoms and alcohol having 3 to 16 carbon atoms (preferably 4 to 12 carbon atoms). The fatty acid ester may be branched. Moreover, ethylene oxide may be contained in the alcohol.

Examples of the above fatty acid ester include butylstearate, butylmyristate, butylpalmitate, sec-butylstearate, t-butylstearate and isoamylstearate. The amount of the fatty acid ester added is in the range of 0.3 to 12% by weight, preferably 0.5 to 5.0% by weight based on the weight of the ferromagnetic powder.

The fatty acid and fatty acid ester are used to improve the jitter property. If the amount of the fatty acid or fatty acid ester added is too small, the effect of preventing the jitter is poor, and if it is too large, problems such as sticking are liable to occur.

The density of the abrasive present in the surface of the magnetic layer was determined by the use of a scanning type electron microscope. That is, five photographs (magnification: 5,000) of different points of the surface were taken, and the number of grains was counted and the average number of grains was calculated. If the density of the abrasive is 0.25 particles/$\mu$ m$^2$ or more, the filling degree of the ferromagnetic powder at surface is decreased, leading to a decrease of the output. The intensity ratio of Al spectrum to Fe spectrum as determined by ESCA is 0.05 to 0.20, or the intensity ratio of Cr spectrum to Fe spectrum as determined by ESCA is 0.02 to 0.08. This indicates the amount of abrasives remaining uncovered on the surface of the magnetic layer, which exert influence directly on the abrasive ability. Even though a large amount of abrasive is present on the surface, if they are covered with the binder, the head cleaning effect is not very extensive. In other words, even though the amount of the abrasive added to the magnetic layer is small, if the Al spectrum/Fe spectrum or Cr spectrum/Fe spectrum is increased, the necessary head cleaning effect can be obtained.

ESCA is an abbreviation of Electron Spectroscopy for Chemical Analysis, and refers to X-ray photoelectron spectroscopic analysis. In accordance with this measuring method, the surface of the magnetic layer is immersed in n-hexane at ordinary temperature (i.e., room temperature) for 5 minutes, and the measurement is carried out at an X-ray intensity of 600 W, 15 kV, 40 mA and using K$\alpha$ ray with the type of the anode of X-ray as Mg. The measuring time was 30 minutes. Al(2S) spectrum, Cr(2P$_{3/2}$) spectrum and Fe(3P) spectrum were measured. For example, Model PH1560 manufactured by ULVAC PHI Corp. can be used in this regard.

In the present invention, the abrasive is added after separate dispersion apart from the ferromagnetic powder dispersion. This separate dispersion increases the dispersibility of the abrasive, making the surface of the magnetic layer smooth, so that the C/N is improved. On the other hand, the $\mu$ value is liable to become high. Due to the separate dispersion of the abrasive, the surface of the abrasive is still covered with a coating of the binder, leading to a decrease of abrasive ability, as a result of which the output is decreased. In the present invention, the surface of the magnetic layer is thus subjected to abrasive treatment using the abrasive tape. This abrasive treatment will hereinafter be explained in detail. This abrasive treatment improves resistance to the decrease of the output and prevents the increase of DO. As the fatty acid is concurrently used, when the abrasive tape treatment is applied, the lubricant in the surface of the magnetic layer is orientated, and there can be obtained a good $\mu$ value and good running characteristics. This orientation of the lubricant was measured by the use of RHEED. RHEED is an abbreviation of Reflection High Energy Electron Diffraction. A video tape was charged in a holder for reflective electron beam diffraction measurement, and an acceleration voltage was set at 75 kV. Details are described in S. Iida ed., *Physical Measuring Techniques*, Vol. 2, Crystal Analysis, published by Asakura Shoten, 1969.

The magnetic recording medium of the present invention comprises the nonmagnetic support and the magnetic layer provided thereon. The magnetic layer comprises a granular component, such as a ferromagnetic powder, and a binder in which the granular component is dispersed. The binder is composed of a resin component and a hardener compounded, if desired.

The magnetic layer can be provided on the non-magnetic support by the usual techniques. For example, the resin component, the ferromagnetic powder, and a magnetic layer-forming component, such as an abrasive and an optional hardener, are kneaded with a solvent and dispersed therein to prepare a magnetic coating solution, and this magnetic coating solution is coated on the non-magnetic support.

The nonmagnetic support is selected from films or sheets of synthetic resins, such as polyesters (e.g., polyethylene terephthalate (PET) and polyethylene naphthalate (PEN)), polyolefins (e.g., polypropylene), cellulose derivatives (e.g., cellulose triacetate and cellulose diacetate), vinyl-based resins (e.g., polyvinyl chloride and polyvinylidene chloride), polycarbonate, polyamide, polyamidoimide, and polyimide; nonmagnetic metal foils, such as aluminum and copper; metal foils, such as stainless steel foils; paper; ceramics sheets; and the like. The thickness of the nonmagnetic support is preferably in the range of from 1 to 100 $\mu$m, particularly preferably in the range of from 3 to 50 $\mu$m.

The binder resin component is selected from resins commonly used as a binder resin component of conventional magnetic coating solution. Examples of the binder resin component are vinyl chloride-based copolymers (e.g., a vinyl chloride-vinyl acetate copolymer, a vinyl chloride-vinyl acetate-vinyl alcohol copolymer, a vinyl chloride-vinyl acetate-acrylic acid copolymer, a vinyl chloride-vinylidene chloride copolymer, a vinyl chloride-acrylonitrile copolymer, an ethylene-vinyl acetate copolymer, and vinyl chloride-based copolymers with a polar group, such as —SO$_3$Na or —SO$_2$Na, and an epoxy group incorporated therein), cellulose derivatives such as a nitrocellulose resin, an acrylic resin, a polyvinyl acetal resin, a polyvinyl butyral resin, an epoxy resin, a phenoxy resin, and a polyurethane resin (e.g., a polyester-polyurethane resin, a polyurethane-based resin with a polar group, such as —SO$_3$Na or —SO$_2$Na, incorporated thereinto, and a polycarbonate-polyurethane resin).

When the hardener is employed, a polyisocyanate compound is preferred in this regard. The polyisocyanate compound is selected from those conventionally used as the hardener component of polyurethane-based resins. Examples of the polyisocyanate compound include a reaction product of 3 mol of tolylene diisocyanate and 1 mol of trimethylolpropane (e.g., Desmodur L-75, produced by Bayer A. G.), a reaction product of 3 mol of diisocyanate, such as xylylene diisocyanate or hexamethylene diisocyanate, and 1 mol of trimethylolpropane, a biuret adduct of 3 mol of hexamethylene diisocyanate, an isocyanurate compound of 5 mol of tolylene diisocyanate, an isocyanurate adduct of 3 mol of tolylene diisocyanate and 2 mol of hexamethylene diisocyanate, and a polymer of isophorone diisocyanate and diphenylmethane diisocyanate.

When hardening is conducted by irradiation with electron beams, compounds having a reactive double bond (e.g., urethane acrylate) can be used.

In the present invention, it is preferred to use a resin having a high hardness, such as a vinyl chloride-based copolymer resin, and a resin having flexibility, such as a polyurethane resin, in combination with each other as the resin component.

When the resin having a high hardness, such as a vinyl chloride-based copolymer, and the resin having flexibility, such as a polyurethane resin, are used in combination, the weight ratio of the former resin to the latter resin is usually selected within the range of 9:1 to 5:5 (preferably 9:1 to 6:4). When the hardener is additionally used, the weight ratio of the binder resin component to the hardener is usually selected to be within the range of 9:1 to 5:5 (preferably 9:1 to 6:4).

In general, when magnetic particles having a relatively low hardness, such as a ferromagnetic metal fine powder, are used as the ferromagnetic powder, the binder is used in an amount larger than when using magnetic particles having a relatively high hardness, such as $\alpha$-$Fe_2O_3$. In this case, the amount of the resin having flexibility, such as a polyurethane-based resin, is usually increased.

When the amount of the polyurethane-based resin is increased, the binder tends to soften. Therefore, there is usually employed a method in which the hardness of the binder is maintained by increasing the amount of the hardener, such as a polyisocyanate compound.

When a polyurethane-based resin is used as the binder resin component, as the hardener, a polyisocyanate compound is used together therewith, the weight ratio of the polyurethane-based resin to the polyisocyanate compound is usually within the range of 1:0.8 to 1:2, with the range of 1:1 to 1:1.5 being preferred. When the weight ratio is controlled within the above specified range, even if a ferromagnetic metal fine powder having a low hardness is used, the softening of the binder as accompanied by the use of the polyurethane-based resin can be prevented effectively.

The total amount of the binder resin component and the hardener is usually within the range of 10 to 100 parts by weight, preferably 15 to 40 parts by weight per 100 parts by weight of the ferromagnetic powder.

Examples of ferromagnetic powders which can be used in the present invention include ferromagnetic powders of metal oxides such as $\alpha$-$Fe_2O_3$, ferromagnetic powders of foreign metal-metal oxides such as $\alpha$-$Fe_2O_3$ containing other components, such as cobalt, and ferromagnetic metal fine powders containing ferromagnetic metals such as iron, cobalt or nickel.

The present invention can be advantageously utilized for production of a magnetic recording medium using a ferromagnetic metal fine powder. That is, even when with the use of the ferromagnetic metal fine powder, a large amount of the hardener is used, and thus the amount of materials attaching onto the magnetic layer or the magnetic head can be decreased and, therefore, there can be produced a magnetic recording medium in which the dropout and the clogging of the magnetic head are decreased.

When the ferromagnetic metal fine powder is used, it is preferred to use a ferromagnetic metal fine powder containing iron, cobalt or nickel and having a specific surface area ($S_{BET}$) of at least 42 $m^2/g$, particularly preferably at least 45 $m^2/g$.

Examples of the ferromagnetic metal fine powder include those alloys in which the metal content is at least 75% by weight, and at least 80% by weight of the metal component is at least one ferromagnetic metal or alloy (e.g., Fe, Co, Ni, Fe—Co, Fe—Ni, Co—Ni, and Co—Ni—Fe), and which may contain other components (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te and Bi) within the range of not more than 20% by weight of the metal component. In addition, there can be used those magnetic particles in which the above ferromagnetic metal component contains a small amount of water (i.e., generally 0.05 to 2.0 wt% based on the ferromagnetic particleμ of water), hydroxide or oxide.

A method of producing the ferromagnetic powder is conventional in nature, and the ferromagnetic powder that is used in the present invention can be produced by known methods.

The ferromagnetic powder is not critical in shape; usually, acicular, granular, dice-like, ellipsoidal or plate-like ferromagnetic powder, for example, is used. In particular, an acicular ferromagnetic powder is preferably used.

The above binder resin component, abrasive, hardener and ferromagnetic powder are kneaded with a solvent, such as methyl ethyl ketone, dioxane, cyclohexanone or ethyl acetate, which is usually employed in preparation of the magnetic coating solution, and dispersed therein to prepare a magnetic coating solution.

As discussed above, the $\alpha$-$Al_2O_3$ or $Cr_2O_3$ abrasive is subjected to separate dispersion apart from the ferromagnetic powder. As the binder for use in the separate dispersion, the aforementioned binders to be used with the ferromagnetic powder in the magnetic layer can be used. Of these, a vinyl chloride copolymer and polyurethane are preferably used. In connection with the solvent, the above mentioned solvents for use in preparation of the magnetic layer can also be used in the abrasive dispersion. Kneading can be carried out by the usual technique, such as by the use of a sand grinder or a ball mill. More specifically, the methods described in, for example, JP-A-62-16242, JP-A-62-16244 and JP-A-62-16245 can be employed for kneading.

The magnetic coating solution may contain, as well as the aforementioned components, additives or fillers commonly used, such as an antistatic agent (e.g., carbon black), a lubricant (e.g., silicone oil), and a dispersant.

The magnetic coating solution thus prepared is coated on the nonmagnetic support. This coating can be carried out by the usual coating techniques, such as by the use of a reverse roll.

The magnetic coating solution is coated in such a manner that the thickness of the magnetic layer of the magnetic recording medium thus obtained is usually within the range of generally 0.5 to 10 μm and preferably 0.5 to 5.0 μm.

The nonmagnetic support for use in the present invention may be provided with a backing layer on the opposite side relative to that on which the magnetic layer has been coated. The backing layer is usually formed by coating the surface of the nonmagnetic support on which the magnetic coating solution has not been provided, with a backing layer-forming coating solution prepared by dispersing the granular component, such as the abrasive and the antistatic agent, and the binder in the organic solvent.

On the magnetic layer or the backing layer provided on the nonmagnetic support, an adhesive layer may be provided.

The layer of the magnetic coating solution coated on the nonmagnetic support is subjected to a treatment to orientate the ferromagnetic powder contained in the magnetic layer, i.e., a magnetic field orientation treatment, and then dried.

After drying, the coating is subjected to a treatment to make the surface smooth. For this surface smoothening treatment, a super calender roll, for example, is used. Calendering is preferably carried out by the use of a combination of two or more, and up to 11 stages, particularly preferably 5 to 7 stage press rolls, that is, a combination of metal rolls and elastic rolls, or a combination of metal rolls, under a nip pressure of 50 to 700 kg/cm. The surface smoothening treatment removes voids resulting from the removal of the solvent at the time of drying, and increases the filling degree of the ferromagnetic powder in the magnetic layer. Thus, a magnetic recording medium having high electromagnetic characteristics can be obtained.

In accordance with the process of the present invention, the surface of the magnetic layer which has been subjected to the surface smoothening treatment, or the surface of the magnetic layer and the surface of the backing layer are subjected to an abrasive treatment by the use of an abrasive tape, under a tension of at least 100 g/cm, preferably 120 to 300 g/cm. It is particularly preferred to employ a method in which the surface subjected to the abrasive treatment using the abrasive tape is ground by the use of a rotary blade, and then rubbed with an unwoven fabric. It is to be noted, however, that the order of the abrasive treatment, the grinding treatment and the withdrawing treatment is not limited to the above sequence.

When the hardener is used as a component in forming the binder at the stage that the above surface smoothening treatment has been applied, at least 90% by weight of the hardener contained in the magnetic layer remains unreacted. It is preferred, therefore, that a hardening treatment is then conducted to react at least 50% by weight, preferably at least 80% by weight, of the hardener, and the subsequent treatment is then carried on.

The hardening treatment includes a heat hardening treatment and an electron beam irradiation hardening treatment. Both treatments can be employed in the present invention.

By this hardening treatment, the unreacted hardener contained in the magnetic layer which has been subjected to the surface smoothening treatment reacts with the resin component, such as a vinyl chloride-based copolymer or a polyurethane-based resin, to form a three dimensional network crosslinked structure.

The step of the heating treatment itself is known; in the process of the present invention, the heating treatment can be carried out according to the known methods.

For example, the heating treatment is carried out by heating at a temperature of at least 40° C., preferably from 50° to 80° C. for a time of at least 20 hours, preferably from 24 hours to 7 days. The step of the hardening treatment by irradiation with electron beam itself is also known. In the process of the present invention, the heating treatment can be carried out by the known methods.

The laminate subjected to the hardening treatment is then cut into the desired form. This cutting can be carried out by the use of the conventional cutting machine, such as slitter, under the common conditions.

The surface of the magnetic layer of the laminate which has been hardened and cut into the desired form, or the surface of the magnetic layer and the surface of the backing layer are abraded by slowing rotating the belt of the abrasive tape. At this abrasive treatment, the belt is rotated at a circumferential speed of 1 to 3 cm/min in the direction opposite to the winding direction of the tape of the magnetic recording medium.

The Figure shows a schematic diagram illustrating one process comprising the abrasive treatment, the grinding treatment, and the withdrawing treatment according to the present invention.

As shown in the Figure, the tape is sent from the supply roll 1, abraded with an abrasive tape 2, ground with a fixed blade 3, withdrawn with an unwoven fabric 4, and finally wound up on a winding roll 5. A feed roll 10 is used to make smooth the feeding of the tape with the supply roll 1.

The abrasive tape 3 is moved at a speed of 1 to 3 cm/min in the direction opposite to that of the tape by the use of a rotary roll 8, and the abrasive tape 3 is pressed by a pad 6, so that the abrasive tape 3 comes into contact with the surface of the magnetic layer to abrade it.

The pad 6 is made of a high hardness material, such as sapphire or super hard alloy. As the top of the pad 6 is sharper, the pad 6 is more effective to use. This is because as the top of the pad 6 is sharper in nature, the linear contact between the abrasive tape and the surface of the magnetic layer becomes smaller. Thus, by increasing the load per unit area, the abrading efficiency can be increased.

In the Figure, the abrasive tape may be in contact with the surface of the magnetic layer at two or more points. When not only the surface of the magnetic layer but also the surface of the backing layer is abraded, another abrading system including the same abrasive tape as above is provided at the opposite side of the tape.

The fixed blade 3 for the grinding treatment may not be used. In place of the fixed bed, a rotary blade can be used. Both the fixed blade and the rotary blade may be used.

When not only the surface of the magnetic layer but also the surface of the backing layer are subjected to the grinding treatment, the fixed blade and/or the rotary blade are provided at the opposite side.

The unwoven fabric 4 is moved at a speed of 0.5 to 10 cm/min in the direction opposite to the sending direction of the tape by the use of the rotary roll 9. The unwoven fabric 4 is pressed by the pad 7 so that the surface of the magnetic layer comes into contact with it, and the withdrawing treatment is conducted.

The pad 7 is made of a metal, such as stainless steel, chromium-plated brass, or aluminated metal, and its shape is semicylindrical or half-round. This pad 7 is designed to press the unwoven fabric uniformly onto the surface of the magnetic layer, thereby removing effectively the powder resulting from the above abrasive treatment. Therefore, it is preferred for the pad to be in the form that brings the tape into uniform contact with the pad over as large a surface as possible.

There may be two or more withdrawing points using the unwoven fabric. When not only the surface of the magnetic layer but also the backing layer are subjected to the withdrawing treatment, the same withdrawing point is provided at the opposite side.

As the abrasive tape for use in the abrasive treatment of the present invention, a tape to abrade the head of cassette deck or video deck, for example, is preferably used. The main purposes to use the abrasive tape are to finish the head surface, to make the top shape of the head, and to remove the chipping of the head.

The abrasive tape for use in the abrasive treatment contains at least one abrasive selected from the group consisting of $\alpha$-$Al_2O_3$, $SiO_2$, $Cr_2O_3$, $\alpha$-$Fe_2O_3$, diamond, $ZnO_2$ and $TiO_2$, which has a Mohs' hardness of from 5 to 10 (preferably from 7 to 9).

The abrasive tape for use in the present invention is produced by the following method, for example.

The above abrasive is dispersed in the binder, the additive, and the like, the resulting dispersion is coated on the support, and then it is dried and cut into the desired form. As the binder, a thermoplastic resin, a thermosetting resin, and a reactive type resin are used singly or in combination with each other. In connection with the mixing ratio of the abrasive and the binder, the binder is used in a proportion of 10 to 200 parts by weight per 100 parts by weight of the abrasive. As the material for the support, films or sheets of synthetic resins, such as polyesters (e.g., polyethylene terephthalate (PET)), polyolefins (e.g., polypropylene), cellulose derivatives, vinyl-based resins, polycarbonate, and polyamide; foils of nonmagnetic metals such as aluminum and copper; stainless steel foils; paper; ceramic sheets; and the like are used.

The surface roughness Ra (average roughness at the central line) of the abrasive tape to be used in the present invention is preferably within the range of from 0.07 to 0.9. The surface roughness Ra of the abrasive tape was measured by the following method.

A central line average roughness-measuring machine, Safcom 400B, 403B, 404B system, was used. Under the conditions that the cutoff value was 0.8 mm, the working speed was 0.3 mm, the needle pressure was 0.07 g, and the needle diameter was 2 μm, the R range was 20 K/0.5, the measurement was conducted.

An abrasive tape can be used as long as it has the above performance. Abrasive tapes commercially available can be used.

The abrasive treatment using the above abrasive tape removes the granular component, such as the ferromagnetic powder or abrasive, projecting from the surface of the magnetic layer and, furthermore, the hardener remaining unreacted on the surface of the magnetic layer and materials attaching onto the surface (for example, dust in the air, attaching onto the surface at the time of production of the magnetic recording medium), etc., along with the binder in the vicinity of the surface of the magnetic layer (generally in the height of 0.01 to 5 μm), thereby smoothening the surface of the magnetic layer.

When the backing layer is also abraded, the removal of the granular component, such as the non-magnetic powder, is reduced and, therefore, even if the magnetic recording medium cut in the form of tape is used in the form that is wound, the problem that the granular component releasing from the surface of the backing layer attaches onto the surface of the magnetic layer, thereby causing the dropout or the clogging, is reduced.

Examples of the material for use in the withdrawing treatment include suede-type unwoven fabrics of the one layer structure, which do not substantially contain a binder component such as polyurethane, and in which bundles of polyester fibers are intermingled with each other (for example, Ecsaine (trade name) produced by Toray Co., Ltd., and Kuralino (trade name) produced by Kuraray Co., Ltd.), and unwoven fabrics in which polyester fibers, for example, are bound together with a binder component such as polyurethane (for example, Vilene (trade name) produced by Japan Vilene Co., Ltd.).

By this withdrawing treatment, the removal of the attachment and organic substance on the magnetic layer and/or the backing layer is completed, and the dropout or clogging is reduced.

It is preferred that prior to the withdrawing treatment of the unwoven fabric, the grinding treatment is applied. The grinding treatment is described in JP-A-62-172532. As the grinding device, a fixed blade, a diamond wheel and a rotary blade can be used.

The fixed blade is a blade in which a portion coming into contact with the surface of the magnetic layer or backing layer is made of high hardness substance. The blade is usually made of materials such as sapphire, alumina, cermet, zirconia (zirconium oxide), silicon nitride, silicon carbide, diamond and super-hard alloy.

The diamond wheel is a cylindrical grinding device which is provided by sintering diamond at the boundary thereof and is rotated.

The rotary blade refers to a grinding device comprising a rotary member and at least one blade provided at periphery of the rotary member along the rotating axis thereof.

The above treatment enhances the effect of the abrasive treatment using the abrasive tape.

Although the present invention has been explained by referring to the method in which after the cutting of the laminate which has been subjected to the surface smoothening treatment, the surface of the magnetic layer, or the surface of the magnetic layer and the surface of the backing layer are subjected to the abrasive treatment using the abrasive tape, the present invention is not limited to this order of steps; for example, a method in which the abrasive treatment is carried out while cutting, or a method in which prior to the cutting, the abrasive treatment is applied, can be employed.

Furthermore, since the hardening reaction gradually proceeds even if the hardening treatment is not applied, it is also possible that after the surface smoothening treatment, without application of the hardening treatment, the surface of the magnetic layer, or the surfaces of the magnetic layer and the backing layer are subjected to the abrasive treatment using the abrasive tape.

In the magnetic recording medium of the present invention, the abrasive is completely dispersed in the binder by the separate dispersion and enveloped therein so that problems such as dropping out of the abrasive are overcome, and on the other hand, although the abrasive in the surface of the magnetic layer is reduced, the abrasive is exposed by rubbing the surface of the magnetic layer with the abrasive tape so that even though the amount of the abrasive is small, the head cleaning effect is increased. The good cleaning effect can be obtained by controlling the amount of the abrasive in the surface of the magnetic layer so that the intensity ratio of Al spectrum to Fe spectrum as determined by ESCA is in the range of 0.05 to 0.20, or the intensity ratio of Cr spectrum to Fe spectrum as determined by ESCA is in the range of 0.02 to 0.08.

The above abrasive tape treatment orientates the fatty acid in the surface of the magnetic layer, thereby greatly decreasing the μ value so that problems such as jitter can be eliminated.

The present invention is described in greater detail with reference to the following examples. All parts are by weight.

EXAMPLE 1

A magnetic coating solution (composition) having the formulation shown below was uniformly kneaded in a ball mill to prepare a magnetic coating solution.

After properly adjusting the viscosity of the prepared magnetic coating solution, the magnetic coating solution was coated on the surface of the polyethylene terephthalate support having a thickness of 10 μm so that the thickness of the magnetic layer was 3.0 μm.

| Magnetic Coating Solution Composition | |
| --- | --- |
| Ferromagnetic metal fine powder (composition: Fe 96 wt %, Ni 4 wt %; specific surface area ($S_{BET}$): 55 m²/g; σs 125 emu/g; Hc: 1,550 Oe) | 100 parts |
| Vinyl chloride copolymer containing an SO$_3$Na group and an epoxy group | 11 parts |
| Polyurethane resin containing an SO$_3$Na group | 6 parts |
| α-Alumina dispersion | 21 parts |
| Carbon black (average particle diameter: 20 nm) | 1 part |
| Methyl ethyl ketone | 95 parts |
| Cyclohexanone | 95 parts |

The α-alumina dispersion was prepared by dispersing the following formulation in a ball mill for hours.

| α-Alumina (average particle diameter: 0.3 μm) | 10 parts |
| --- | --- |
| Vinyl chloride copolymer (same as above) | 1 part |
| Methyl ethyl ketone | 5 parts |
| Cyclohexanone | 5 parts |

Including the above α-alumina dispersion, the above magnetic coating solution composition was mixed and dispersed in a ball mill for 48 hours. Just before the coating, 6 parts of polyisocyanate (Coronate L), 0.5 part of stearic acid, and 1.5 parts of butyl stearate were added, and the resulting mixture was stirred and mixed to prepare a magnetic coating solution. The magnetic coating solution thus obtained was coated on a 10 μm thick polyethylene terephthalate film in a dry thickness of 3 μm by the doctor coating method, and then the orientation was conducted at 3,000 Gauss by the use of a Co permanent magnet. Thereafter, after drying, a 5-stage super calendering treatment in which metal rolls and elastic rolls were provided alternately was conducted at a metal roll temperature of 80° C. and a calender roll linear pressure of 240 kg/cm to thereby produce a laminate comprising the nonmagnetic support and the magnetic layer.

The laminate was heated at 60° C. for 24 hours to harden the polyisocyanate compound contained in the magnetic layer, slit to 8 mm, subjected to the abrasive treatment using an abrasive tape having a surface roughness Ra of 0.07 (K-10000 (abrasive $Cr_2O_3$ particles), produced by Fuji Photo Film Co., Ltd.), and then subjected to the withdrawing treatment using a suede-type unwoven fabric to produce a tape for an 8 mm video.

Conditions for Abrasive Treatment

As illustrated in the Figure, the abrasive tape 2 was moved under a tension of 150 g/cm at a speed of 1.5 cm/min by the rotary roll 8 in the direction opposite to that of the tape moving at a speed of 7 m/sec. Since the abrasive tape was pressed from above by the pad 9, it came into contact with the surface of the magnetic layer of the tape.

Evaluation Methods (1) 7 MHz-RF Output (RF-OUT) and C/N

A sine wave of 7 MHz single frequency was recorded at the optimum recording wavelength by the use of 8 mm video deck, FUJIX-M860HK (manufactured by Fuji Photo Film Co., Ltd.). By the use of a spectrum analyzer HP3585A (manufactured by Hewlett Packard Ltd.), the spectrum was measured, and the determination was made from the ratio of the noise level of noise 6 MHz to the carrier.

(2) Decrease of Output

By the use of the same deck as used and at the SP mode of 7 MHz single frequency, the RF output was measured at an amplitude of the cycloscope and at 10 passes.

(3) Increase of Dropout

Using the same deck as used above, a color bar was input with a threshold level, and the dropout at 15 sec and −18 dB at the time of reproduction, was measured by Shibasoku VHO1BZ (i.e., a DO counter) (manufactured by Shibasoku Co., Ltd.).

(4) Jitter

Using the same deck as used above, a color bar was input, and the jitter was measured by the use of a Jitter Meter MK611A (manufactured by Meguro Denki Co., Ltd.).

The results are shown in the Table 1 below.

TABLE 1

| No. | Constitution Factor ||||||||| Evaluation |||||
|---|---|---|---|---|---|---|---|---|---|---|---|---|---|
| | Type of Abrasive/Amount || Abrasive Dispersing Method | Amount of Abrasive in Surface | Intensity Ratio of Al Spectrum/ Fe Spectrum | Cr/Fe | Lubricant | Orientation | Tension of Abrasive Tape (g) | 7 MHz RF-OUT (dB) | C/N (dB) | Decrease of Output | Number of Increase of Dropout | Jitter (μsec) |
| 1 | α-Al₂O₃ | 10% | Added at the intermediate point | 0.79 | 0.27 | — | None | No | None | 0 | 0 | -0.1 | 120 | 0.35 |
| 2 | α-Al₂O₃ | 10% | Separate dispersion | 0.19 | 0.16 | — | SA/BS | Yes | 150 | 3.8 | 3.5 | 0 | 5 | 0.07 |
| 3 | α-Al₂O₃ | 5% | Separate dispersion | 0.12 | 0.08 | — | " | " | " | 4.3 | 3.9 | -0.2 | 7 | 0.09 |
| 4 | α-Al₂O₃ | 15% | Separate dispersion | 0.22 | 0.19 | — | " | " | " | 3.6 | 3.4 | 0 | 4 | 0.05 |
| 5 | Cr₂O₃ | 10% | Separate dispersion | 0.21 | — | 0.05 | " | " | " | 3.2 | 3.0 | 0 | 8 | 0.08 |
| 6 | Cr₂O₃ | 5% | Separate dispersion | 0.16 | — | 0.03 | " | " | " | 3.5 | 3.3 | -0.4 | 6 | 0.12 |
| 7 | α-Al₂O₃ | 3% | Separate dispersion | 0.09 | 0.03 | — | " | " | " | 3.0 | 2.8 | -2.3 | 50 | 0.18 |
| 8 | α-Al₂O₃ | 18% | Separate dispersion | 0.24 | 0.25 | — | " | " | " | 1.3 | 0.8 | 0 | 12 | 0.10 |
| 9 | α-Al₂O₃ | 10% | Separate dispersion | 0.18 | 0.16 | — | None | No | " | 3.6 | 3.3 | -1.8 | 150 | 0.42 |
| 10 | α-Al₂O₃ | 10% | Separate dispersion | 0.19 | 0.09 | — | SA/BS | " | 50 | 2.9 | 2.1 | -1.5 | 9 | 0.29 |
| 11 | α-Al₂O₃ | 10% | Separate dispersion | 0.19 | 0.02 | — | " | " | None | 3.2 | 3.1 | -0.9 | 85 | 0.38 |
| 12 | α-Al₂O₃ | 10% | Simultaneous dispersion with the magnetic powder | 0.15 | 0.04 | — | SA/BS | No | 50 | 1.7 | 1.4 | -2.1 | 10 | 0.23 |
| 13 | Cr₂O₃ | 3% | Separate dispersion | 0.11 | — | 0.007 | " | Yes | 150 | 2.8 | 2.6 | -1.9 | 72 | 0.17 |
| 14 | Cr₂O₃ | 18% | Separate dispersion | 0.32 | — | 0.10 | " | " | " | 1.4 | 0.9 | -0.3 | 12 | 0.08 |

SA: Stearic Acid
BS: Butyl Stearate

As is apparent from the results of Table 1, the samples of the present invention, Nos. 2 to 6, are good in all the aspects of RF output (RF-OUT), C/N, decrease of output, increase of dropout, and jitter. On the other hand, in Sample Nos. 7, 8, 13 and 14 in which the amount of the abrasive added is too large, or too small, no good results can be obtained. In Sample Nos. 1 and 12 in which the addition of the abrasive is not by way of a separate dispersion, and Sample Nos. 1 and 14 in which the amount of the abrasive in the surface is too large, and in Sample Nos. 7, 8, 13 and 14 in which Al/Fe or Cr/Fe is not within the above specified range of the present invention, no good results are obtained.

In Sample Nos. 1 and 9 in which no lubricant is used, and in Sample Nos. 1, 9, 10, 11 and 12 in which no orientation is applied, no well-balanced tape is obtained.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer containing a ferromagnetic powder and a binder; wherein the magnetic layer contains abrasive particles comprising at least one of $\alpha$-$Al_2O_3$ or $Cr_2O_3$ in an amount of 5 to 15% by weight based on the weight of the ferromagnetic powder, the density of said abrasive particles in the surface of the magnetic layer away from the support is less than 0.25 particles/$\mu m^2$, the intensity ratio of Al spectrum to Fe spectrum as determined by ESCA is in the range of 0.05 to 0.20, and/or the intensity ratio of Cr spectrum to Fe spectrum as determined by ESCA is in the range of 0.02 to 0.08, the magnetic layer contains a fatty acid or a fatty acid ester, and the fatty acid or fatty acid ester is oriented towards said surface of the magnetic layer; and wherein said magnetic layer is formed by coating a magnetic coating solution on said support, said coating solution having been prepared by adding a dispersion containing said abrasive particles and a first portion of said binder to a separate dispersion containing said ferromagnetic powder and a second portion of said binder.

2. A magnetic recording medium as in claim 1, wherein average particle size of the $\alpha$-$Al_2O_3$ and $Cr_2O_3$ is in the range of 0.1 to 1.0 $\mu m$.

3. A magnetic recording medium as in claim 1, wherein said fatty acid is used in an amount of 0.1 to 5.0% by weight based on the weight of the ferromagnetic powder.

4. A magnetic recording medium as in claim 1, wherein said fatty acid ester is used in an amount range of 0.3 to 12% by weight based on the weight of the ferromagnetic powder.

5. A magnetic recording medium as in claim 1, wherein said fatty acid is a saturated or unsaturated fatty acid having 14 to 24 carbon atoms and said fatty acid ester is a branched or unbranched ester of a fatty acid having 14 to 24 carbon atoms and an alcohol having 3 to 16 carbon atoms.

6. A magnetic recording medium as in claim 1, wherein the density of the abrasive particles is in the range of 0.10 to less than 0.25 particles/$\mu m^2$.

* * * * *